United States Patent
John et al.

(10) Patent No.: US 10,970,357 B2
(45) Date of Patent: Apr. 6, 2021

(54) SYSTEM AND METHOD FOR VISUALIZATION OF TAG METADATA ASSOCIATED WITH A MEDIA EVENT

(75) Inventors: Ajita John, Holmdel, NJ (US); Shreeharsh Kelkar, Summit, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 472 days.

(21) Appl. No.: 12/847,984

(22) Filed: Jul. 30, 2010

(65) Prior Publication Data
US 2012/0030244 A1 Feb. 2, 2012

(51) Int. Cl.
G06F 16/30 (2019.01)
G06F 16/958 (2019.01)
(52) U.S. Cl.
CPC .................. *G06F 16/958* (2019.01)
(58) Field of Classification Search
CPC ........... G06F 17/30289; G06F 17/3089; G06F 17/30997
USPC .......................... 707/736, 797, 805, 829, 913
See application file for complete search history.

(56) References Cited

U.S. PATENT DOCUMENTS 7,296,032 B1 * 11/2007 Beddow
7,693,906 B1 * 4/2010 Amidon ............ G06F 17/30038
707/749
2005/0193010 A1 * 9/2005 DeShan ................. G06Q 30/02
2007/0079321 A1 * 4/2007 Ott, IV ........................... 725/18
2007/0090951 A1 * 4/2007 Chan ..................... G06Q 10/00
340/572.1
2008/0235259 A1 * 9/2008 Abernethy et al. ........... 707/102
2009/0046898 A1 * 2/2009 Li ..................... G06F 17/30554
382/113
2010/0211575 A1 * 8/2010 Collins ............. G06F 17/30044
707/749
2011/0061068 A1 * 3/2011 Ali ..................... G06Q 30/0241
725/9
2011/0082848 A1 * 4/2011 Goldentouch ................ 707/706
2011/0107273 A1 * 5/2011 Ranganathan et al. ....... 715/854
2011/0113385 A1 * 5/2011 Sayers et al. ................. 715/853

\* cited by examiner

Primary Examiner — Irete F Ehichioya
Assistant Examiner — Johnese T Johnson
(74) Attorney, Agent, or Firm — Sheridan Ross P.C.

(57) ABSTRACT

A system and method are provided for summarizing multiple aspects of tags associated with media events. In the system and method, tag metadata for tags generated at one or more user interfaces associated with at least one media event is obtained. Thereafter, tags are organized into a hierarchy of tags based on the metadata and a metadata sorting criteria. Additionally, tag significance data for tags is computed based on the metadata and the hierarchy. A visual representation of the tags can then be generated, where indicia for the tags is spatially arranged to visually depict the hierarchy of the tags are selected to visually depict at least a relative significance among sibling tags in the hierarchy.

17 Claims, 5 Drawing Sheets

600

SYSTEM AND METHOD FOR VISUALIZATION OF TAG METADATA ASSOCIATED WITH A MEDIA EVENT

BACKGROUND

1. Technical Field

The present disclosure relates to tagging of media event and more specifically to systems and methods for displaying tag metadata associated with media events.

2. Introduction

A conventional tag cloud or word cloud (or weighted list in visual design) generally provides a visual depiction of user-generated tags, metadata, or content of a web site or other on-line content. Tags in a tag cloud are usually presented as a list of words, where the words are normally listed alphabetically and the importance of a tag is shown with font size or color. Thus, it is possible to find a tag alphabetically and by popularity. The tags can also provide hyperlinks that lead to content, at the web site or other web sites, which is associated with the tags.

Tag clouds can also be used to provide a summary of tags for other types of media events, such a teleconferences, video conferences, and television broadcasts, in real time or thereafter. For example, during a concert, users viewing the event can tag portions of the concert with tags such as "nice guitar solo", "Hotel California", or "MP3 available at iTunes". Thereafter, the tags can be summarized as a tag cloud. Accordingly, a user can thereafter view the tag cloud and obtain a summary of the media event based on other users' tagging and the frequency and/or importance of the tags to these other users. Unfortunately, tag clouds are generally configured to provide an overall summary of the tags associated with a media event and are of limited use in evaluating or summarize other metadata associated with the tags.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for summarizing multiple aspects of tags associated with media events. First, tag metadata can be obtained for tags generated at one or more user interfaces associated with at least one media event. For example, the one or more user interfaces can correspond to multiple individuals tagging a media event simultaneously in real time or multiple individuals tagging a recorded event at different times. Thereafter, the tags can be organized into a hierarchy of tags based on the metadata and a set of metadata sorting criteria. Concurrently or thereafter, tag significance data can be computed for the tags based on the metadata and the hierarchy. Finally, a visual representation of the tags can be generated. In the visual representation, indicia for the tags are spatially arranged to visually depict the hierarchy of the tags. Further, the indicia for the tags are selected to visually depict at least a relative significance among sibling tags in the hierarchy.

In the present disclosure, the relative significance of the tags can be depicted by adjusting at least one of a size, a shape, a style, or a color of each one of the indicia.

In one configuration, generating the visual representation involves spatially arranging all or part of the indicia to form a treemap of the indicia, where sibling tags in the hierarchy define sibling nodes in the treemap. In one embodiment, sibling tags share at least one common parent tag. In another configuration, generating the visual representation involves spatially arranging the indicia to form a set diagram-type representation for the indicia, wherein each group of sibling tags in the hierarchy defines a group of sibling subsets for the set diagram. In some instances, the group of sibling subsets in the set diagram can be spatially arranged to form a facet diagram. Further, at least one characteristic of the indicia for sibling subsets and a corresponding parent subset can be different. For example, a boundary line for the sibling subsets and a boundary line for a parent subset of the sibling subsets can be different.

In the examples set forth below, the hierarchy in the various visualizations is not fixed. The hierarchy can be user-configurable. For example, a user can indicate that the top level is all tags from users at vice president level, a next level is tags from users at director level, and so forth. In one variation, a top level includes tags that relate to organizations, a second level relates to projects within the organizations, and a third level relates to project feature.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As described above, tag clouds can be a useful technique for summarizing the significance of tags associated with a media event. However, while such tag clouds may be used to provide an overall summary of tags associated with a media event, such conventional tag clouds for media events generally fail to describe or otherwise summary other metadata associated with the tags. For example, a tag cloud for a conference displaying key words for the conference will generally be unable to concurrently provide a summary of other data associated with the tag cloud, such the interrelation between speakers, speaker times, participants, topics tags, comments, segments, etc.

The present disclosure addresses the need in the art for presenting users with a description or summary regarding metadata associated with tags of a media event. In particular, a system, method and non-transitory computer-readable media are disclosed herein for presenting users a representation of the tags, where the representation is configured to visually depict the relationship of the tags to one or more types of metadata.

In operation, a system for generating representations of the tags in accordance with the present disclosure can be configured for receiving requests to present the tags associated with a media event. Responsive to the requests, tag metadata for the tags associated with the media event can be retrieved and the tags can be organized into a hierarchy of tags based on the metadata and some metadata sorting criteria. Thereafter, tag significance data can be computed for the tags based on the metadata and the hierarchy and a visual representation of the tags can be generated. In the representation, indicia for the tags are spatially arranged to visually depict the hierarchy of the tags and are selected to visually depict at least a relative significance among sibling tags in the hierarchy. An exemplary environment supporting tagging for media events is illustrated with respect to FIG. 1.

Figure 1:
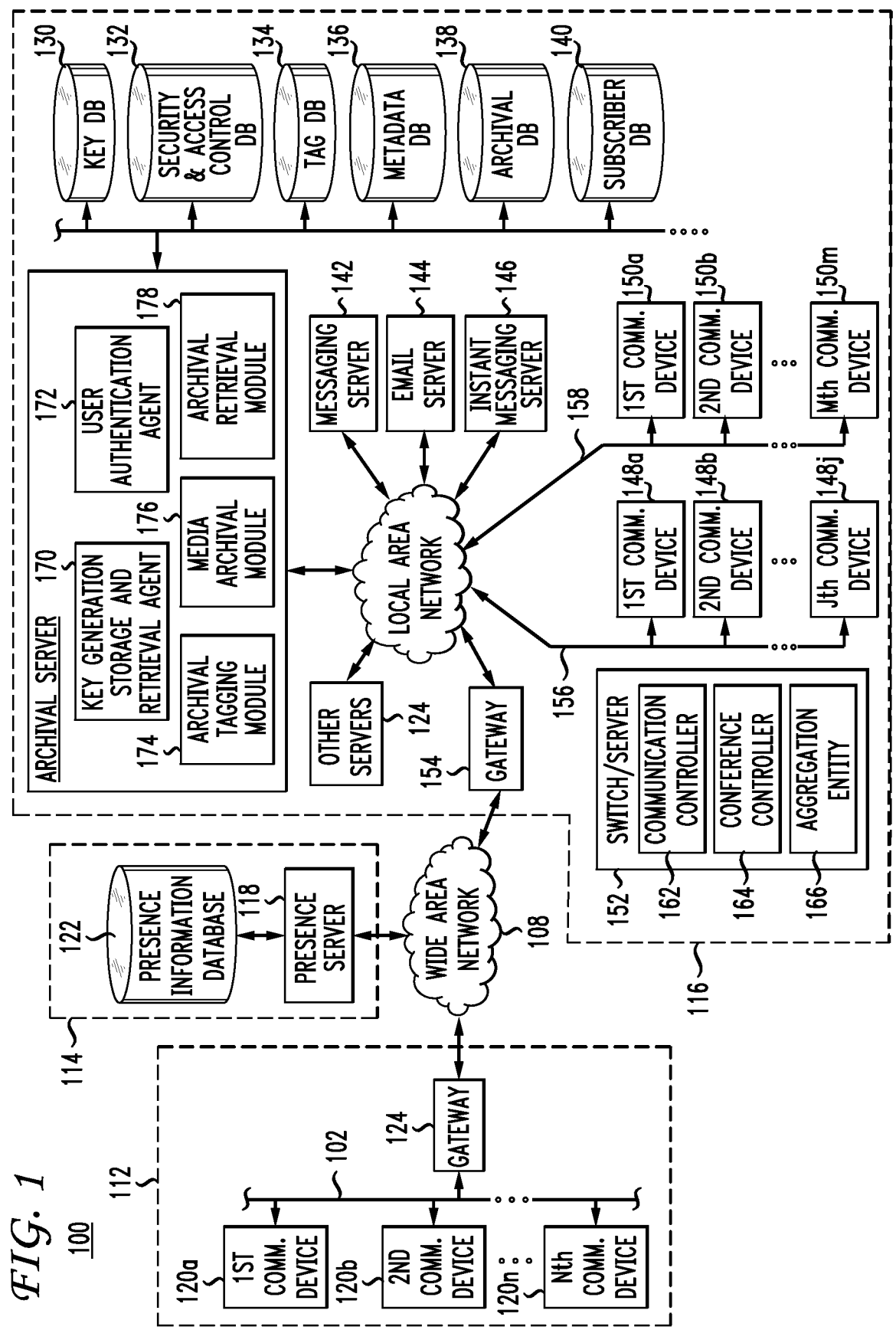
FIG. 1 is a block diagram of an exemplary communications architecture for supporting tagging during a media event.

FIG. 1 is a block diagram of an exemplary communications architecture 100 for supporting tagging during a media event. Although communications architecture 100 will be described below as including specific number and types of components, this is for illustrative purposes. Rather, the present disclosure contemplates the use of other architectures, including architectures with more or less components than shown in FIG. 1.

As shown in FIG. 1, first and second enterprise Local Area Networks (LANs) 102 and 104 and presence service 114 are interconnected by one or more Wide Area private and/or public Network(s) (WANs) 108. The first and second LANs 102 and 104 correspond, respectively to first and second enterprise networks 112 and 116.

As used herein, the term "enterprise network" refers to a communications network associated and/or controlled by an entity. For example, enterprise networks 112 and 116 can be a communications network managed and operated by a telephony network operator, a cable network operator, a satellite communications network operator, or a broadband network operator, to name a few.

The first enterprise network 112 includes communication devices 120a, 120b . . . 120n (collectively "120") and a gateway 124 interconnected by the LAN 102. The first enterprise network 112 may include other components depending on the application, such as a switch and/or server (not shown) to control, route, and configure incoming and outgoing contacts.

The second enterprise network 116 includes a gateway 124, an archival server 128 maintaining and accessing a key database 130, a security and access control database 132, a tag database 134, a metadata database 136, an archival database 138, and a subscriber database 140, a messaging server 142, an email server 144, an instant messaging server 146, communication devices 148a, 148b, . . . , 148j (collectively "148"), communication devices 150a, 150b, . . . , 150m (collectively "150"), a switch/server 152, and other servers 154. The two enterprise networks may constitute communications networks of two different enterprises or different portions a network of single enterprise.

A presence service 114, which can be operated by the enterprise associated with one of networks 104 and 108, includes a presence server 118 and associated presence information database 122. The presence server 118 and presence information database 122 collectively track the presence and/or availability of subscribers and provide, to requesting communication devices, current presence information respecting selected enterprise subscribers.

As used herein, a "subscriber" refers to a person who is serviced by, registered or subscribed with, or otherwise affiliated with an enterprise network, and "presence information" refers to any information associated with a network node and/or endpoint device, such as a communication device, that is in turn associated with a person or identity. Examples of presence information include registration information, information regarding the accessibility of the endpoint device, the endpoint's telephone number or address (in the case of telephony devices), the endpoint's network identifier or address, the recency of use of the endpoint device by the person, recency of authentication by the person to a network component, the geographic location of the endpoint device, the type of media, format language, session and communications capabilities of the currently available communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted. Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile.

The WAN(s) can be any distributed network, such as packet-switched or circuit-switched networks, to name a few. In one configuration, the WANs 108 include a circuit-switched network, such as the Public Switch Telephone Network or PSTN, and a packet-switched network, such as the Internet. In another configuration, WAN 108 includes only one or more packet-switched networks, such as the Internet.

The gateways 124 can be any suitable device for controlling ingress to and egress from the corresponding LAN. The gateways are positioned logically between the other components in the corresponding enterprises and the WAN 108 to process communications passing between the appropriate switch/server and the second network. The gateway 124 typically includes an electronic repeater functionality that intercepts and steers electrical signals from the WAN to the corresponding LAN and vice versa and provides code and protocol conversion. Additionally, the gateway can perform various security functions, such as network address translation, and set up and use secure tunnels to provide virtual private network capabilities. In some protocols, the gateway bridges conferences to other networks, communications protocols, and multimedia formats.

In one configuration, the communication devices 120, 148, and 150 can be packet-switched stations or communication devices, such as IP hardphones, IP softphones, Personal Digital Assistants or PDAs, Personal Computers or PCs, laptops, packet-based video phones and conferencing units, packet-based voice messaging and response units, peer-to-peer based communication devices, and packet-based traditional computer telephony adjuncts.

In some configurations, at least some of communications devices 120, 148, and 150 can be circuit-switched and/or time-division multiplexing (TDM) devices. As will be appreciated, these circuit-switched communications devices are normally plugged into a Tip ring interface that causes electronic signals from the circuit-switched communications devices to be placed onto a TDM bus (not shown). Each of the circuit-switched communications devices corresponds to one of a set of internal (Direct-Inward-Dial) extensions on its controlling switch/server. The controlling switch/server can direct incoming contacts to and receive outgoing contacts from these extensions in a conventional manner. The circuit-switched communications devices can include, for example, wired and wireless telephones, PDAs, video phones and conferencing units, voice messaging and response units, and traditional computer telephony adjuncts. Although not shown, the first enterprise network 112 can also include circuit-switched or TDM communication devices, depending on the application.

Although the communication devices 120, 148, and 150 are shown in FIG. 1 as being internal to the enterprises 112 and 116, these enterprises can further be in communication with external communication devices of subscribers and nonsubscribers. An "external" communication device is not controlled by an enterprise switch/server (e.g., does not have an extension serviced by the switch/server) while an "internal" device is controlled by an enterprise switch/server.

The communication devices in the first and second enterprise networks 112 and 116 can natively support streaming IP media to two or more consumers of the stream. The devices can be locally controlled in the device (e.g., point-to-point) or by the gateway 124 or remotely controlled by the communication controller 162 in the switch/server 152. When the communication devices are locally controlled, the local communication controller should support receiving instructions from other communication controllers specifying that the media stream should be sent to a specific address for archival. If no other communication controller is involved, the local communication controller should support sending the media stream to an archival address.

The archival server 128 maintains and accesses the various associated databases. This functionality and the contents of the various databases are discussed in more detail below.

The messaging server 142, email server 144, and instant messaging server 146 are application servers providing specific services to enterprise subscribers. As will be appreciated, the messaging server 142 maintains voicemail data structures for each subscriber, permitting the subscriber to receive voice messages from contactors; the email server 144 provides electronic mail functionality to subscribers; and the instant messaging server 146 provides instant messaging functionality to subscribers.

The switch/server 152 directs communications, such as incoming Voice over IP or VoIP and telephone calls, in the enterprise network. The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. The switch/media server can be any architecture for directing contacts to one or more communication devices.

The switch/server 152 can be a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Exemplary control programs include a communication controller 162 to direct, control, and configure incoming and outgoing contacts, a conference controller 164 to set up and configure multi-party conference calls, and an aggregation entity 166 to provide to the archival server 128 plural media streams from multiple endpoints involved in a common session. The switch/server can include a network interface card to provide services to the associated internal enterprise communication devices.

The switch/server 152 can be connected via a group of trunks (not shown) (which may be for example Primary Rate Interface, Basic Rate Interface, Internet Protocol, H.323 and SIP trunks) to the WAN 108 and via link(s) 156 and 158, respectively, to communications devices 148 and communications devices 150, respectively.

Other servers 154 can include a variety of servers, depending on the application. For example, other servers 154 can include proxy servers that perform name resolution under the Session Initiation Protocol or SIP or the H.323 protocol, a domain name server that acts as a Domain Naming System or DNS resolver, a TFTP server 334 that effects file transfers, such as executable images and configuration information, to routers, switches, communication devices, and other components, a fax server, ENUM server for resolving address resolution, and mobility server handling network handover, and multi-network domain handling.

The systems and methods of the present disclosure do not require any particular type of information transport medium or protocol between switch/server and stations and/or between the first and second switches/servers. That is, the systems and methods described herein can be implemented with any desired type of transport medium as well as combinations of different types of transport media.

Although the present disclosure may be described at times with reference to a client-server architecture, it is to be understood that the present disclosure also applies to other network architectures. For example, the present disclosure applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Moreover, the present disclosure does not require a specific Internet Protocol Telephony (IPT) protocol. Additionally, the principles disclosed herein do not require the presence of packet- or circuit-switched networks.

In system 100, the archival server 128 can include a number of computational components. For example, as shown in FIG. 1, these components can include the key generation, storage, and retrieval agent 170, user authentication agent 172, archival tagging module 174, media archival module 172, and archival retrieval module 178.

The key generation, storage, and retrieval agent 170 generates keys for storing selected information in encrypted form. The keys are normally pointers to the stored content and are stored in the key database 130 and are organized to form indices to the stored archives. The keys are preferably unique. Although the keys are shown as being generated by the archival server 128, they could also be generated by the communication controller 162.

The user authentication agent 172, using subscriber profiles in the security and access control database 132, authenticates subscribers and, if successfully authenticated, determines what stored information (e.g., tags, metadata, and archives) the subscriber is authorized to have access to. Authorization can be done by any suitable technique, including username, personal identification number, digital certificate, symmetric keys, asymmetric keys, and the like.

The media archival module 176 stores activity-related or archival information or data in the archival database 138. Such information or data includes all or selected portions of communications, and all or selected portions of documents. In one implementation, voice streams (and video streams) are stored, archived, tagged, and available for future retrieval. The module 176 receives media streams for media events and stores these media stream. In some configurations, the media streams can be received in encrypted form or ciphertext. The media streams can be stored using mass storage technology. For example, mass storage technologies such as digital video recorder (DVR) or video on demand (VOD) technologies. The media stream can be indexed in the archival database 138 using the keys in the key database 130. The media can then be stored in an encrypted or unencrypted form.

The archives can be stored in the archival database 138 in any number of formats, including proprietary and non-proprietary formants, and using any means for compressing or storing media for digital storage or communication. For example, the archives can be stored using an MPEG format (or any variants thereof) or Microsoft Corporation's Windows™ media file format. The archival database 138 can alternatively be a flat file/directory structure with an index scheme (e.g., an index file or directory structure based on subscriber identifier (e.g., electronic address), date stamp, time stamp, or unique identifier specified at the time of recording by the subscriber or another entity).

The archival tagging module 174 receives data tags and the unique archival key and creates search and relevance tags for the archived information. As used herein, tags are a type of metadata that is descriptive of the archived information. As will be appreciated, "metadata" is data that describes data objects. Tags typically are a code or set of characters inserted into a file or data structure indicating how the corresponding stored information is to be interpreted. The tags can be the form of eXtensible MarkUp Language (XML) or some other markup language. The tagging module 174 allows for configuration of user permissions to the databases or to specific subsets of archives and associated metadata, allows users to retrieve and view specific metadata elements that are non-modifiable, such as date stamp, a time stamp, recording length, etc.; allows users to enter a specific set of comma-delimited tags that become part of the metadata associated with a particular archive index entry, allows users to retrieve, view and update specific data elements that are modifiable (e.g., the tags previously entered), and maintains an index of tags, also referred to as a tag cloud (discussed below), that represents the unique subset of all tags specified by a user or group of users against any number of archive files.

Data tags include metadata descriptive of an activity, such as related to party (e.g., identities (name and/or electronic address) of parties to the communication, etc.), time (e.g., a date stamp and/or time stamp associated with a communication, a duration of the communication, etc.), form of recording of the activity (e.g., format of the recording, identifier associated with the recording (e.g., a unique identifier provided by the subscriber), etc.), and activity context (e.g., a reason for the communication, topics discussed (e.g., the keywords identified by the user agent 160), activities of each party prior and/or subsequent to and/or during the conversation (e.g., as determined by the user agent 160 by monitoring the computational operations of its corresponding communication device), and threading (whether the recorded activity was related to a previous activity)). The data tags may be obtained from other computational components, from the text of the communication, and/or from the subscriber(s). When received from the subscriber, the tags are a type of meta-tag.

Search and relevance tags can be generated from the metadata. The archival tagging module 174 normally includes an engine that refines and filters the data tags to produce the search and relevance tags. Factors used in search and relevance tag generation include a selected set of enterprise tags (e.g., tags selected by enterprise management), type of communication, context of communication, time stamp of communication, the level of order relationship (e.g., use first, second, . . . $n^{th}$ order relationships to describe the degree of relevance of tags), frequency of topic, breadth of communication on the topic, and recency of topical communication. Enterprise tags are tags mandated by enterprise management to provide coherence to the search engine. For example, data tags are mapped to the enterprise tags to avoid multiple tags referring to the same topic. This enhances topical search accuracy as the search terms for a given topic are standard. The system will automatically build more enterprise tags for itself as users enter topics in their queries for information not already embodied by an enterprise tag. In this case, the system will create a new enterprise tag based on the topic of the query, build $n^{th}$ order relationships between the topics if multiple topics were entered, and create quickly scannable indexes for the topic(s) for future update and scanning. In one configuration, the user agent 160 provides, from a topical search window, to the subscriber a list of search and relevance tags from which the subscriber may select one or more search terms to be used. Search and relevance tags are stored in the tag database 134 while other metadata, such as data tags and/or date/time stamp data, are stored in a metadata database 136.

Tags can be any keyword or set of keywords, and data tags can be captured as written text or as spoken words translated to written text using an analog-to-digital converter and Speech-To-Text (STT) conversion. Additionally, some data tags (e.g., such as date/time stamp and participant identifiers) may be automatically captured as tags. As noted, the system can present the subscriber with a list of pre-existing or pre-determined (e.g., enterprise) tags, from which the subscriber can select one or more tag. For subscriber selected or inputted data tags, the subscriber needs to have access to either a device capable of capturing voice (e.g., a microphone), a keyboard, a mouse, or other human interface device, linked to an interface capable of capturing his or her data tag selection(s). The interface, for example, can be a speech recording/recognition engine, a Web browser, and other software application. The data tags are then transported to the archival server substantially simultaneously with the media. In one variation, the system collects a group of data tags and transmits the group of data tags periodically or when a threshold quantity of data tags are collected.

In some configurations, tags can be associated with other content related with the media event. That is, a user interface at communications devices 120, 148, or 150 can be configured to provide capabilities for the subscriber to enter tags and any other information during display of the online content or display of the media event. For example, a subscriber could enter information specifying the location of other content associated with the media event. Such an interface can be provided via an HTML web-page being opened by the archival tagging module 174 via the Hyper-Text Transfer Protocol (HTTP) via a locally executed HTML browser. However, the present disclosure contemplates providing other types of interfaces for subscribers to input tags and other information. Thereafter, a user interface at one of communications devices 120, 148, or 150 can be configured to allow the subscriber to access, during viewing of an online content or during a media event, the additional content by selection of an associated tag.

In some configurations, the application that is responsible for interacting with the subscriber during the conversation itself (e.g., to start/control/stop recording and digitizing) prompts the subscriber via the subscriber's communication link to speak a set of data tags and runs the spoken data tags through a speech recognition engine, passing the resulting translated data tags to the metadata database 136 along with other metadata values. This can require incorporating the prompt-upon-call-recording-termination activities into the call recording application and integrating a speech-to-text function into one of two places. The call recording application can parse and translate the data tags, passing them as additional items of metadata to the archival tagging module 174. Alternatively, the call recording application can pass a digitized set of spoken data tags to the tagging module 174 and allows the tagging module 174 to process that stream of audio into keywords and translate them to text, storing them as part of the associated metadata.

The archival retrieval module 178 receives search queries from subscribers for stored information, which may be archives, metadata, search and relevance tags, or fluent persons in a selected topic, performs the search in the corresponding database, and returns the located information to the requesting communication device for presentation to the subscriber. In other words, the module 178 presents users with a list of metadata fields upon which the index can be searched, presents users with the tag cloud (e.g., the collection of all possible unique tags for which that user has permissions), allows the user to specify metadata values or select one or more tags from the user's tag cloud and retrieve from the index a list of all archives whose metadata or tag elements match those specified by the user, allows the user to identify one or more specific archives that he or she wishes to retrieve from a repository, and retrieves the specified archives for transmission/playback to the user. For example, the module 178 can receive a search query and, in response, generate, based on the relevance of the tags associated with archived media, a list of potential archived media satisfying the query in question. The retrieved archived media could be played back as a telephone call or displayed as a file sent to the subscriber, based on preferences and permissions that are enforced on the archival retrieval module 178. The search mechanism can be Web-based, voice-based, text-based, or by some other means.

In a simple configuration, one party in the conversation controls the start-stop of the recording. Depending upon the implementation, the archival tagging module 174 and the archiving retrieval module 178 can have user-based permissions and individualized (user-based) indices into archives that will allow one or more parties to tag a specific archive according to unique and individualized data tags. In other words, the archived media will have two different sets of data tags corresponding to the different subscribers. Either subscriber may later retrieve that archive based on the data tags specified in the metadata fields, either based on individualized or shared (enterprise) tags.

As will be appreciated, multiple media archival servers in a given enterprise can handle media processing and storage. The various databases 130, 132, 134, 136, 138, and 140 may have their data configured according to a relational database architecture, an object oriented database architecture, or configured for access by another type of database architecture. Additionally, the data repository or storage may be simply a collection of one or more data files, wherein the data therein may be ordered or unordered.

Figure 2:
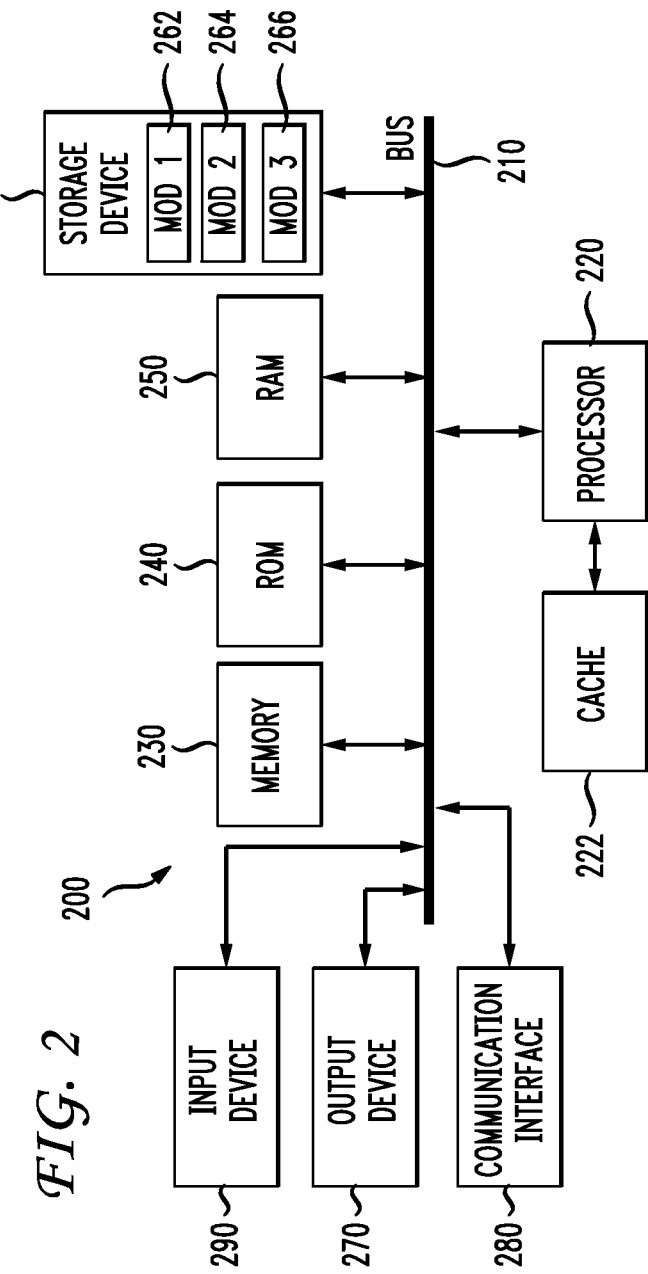
FIG. 2 illustrates a general-purpose computing device for implementing any of the components in FIG. 1.

With reference to FIG. 2, a general-purpose computing device 200 is provided for implementing any of the components in FIG. 1. Although a particular architecture is illustrated for computing device 200, this is for illustrative purposes only. The present disclosure contemplates using one or more computing devices having more or less components than shown in FIG. 2.

As shown in FIG. 2, the computing device 200 includes a processing unit (CPU or processor) 220 and a system bus 210 that couples various system components including the system memory 230 such as read only memory (ROM) 240 and random access memory (RAM) 250 to the processor 220. The system 200 can include a cache 222 of high speed memory connected directly with, in close proximity to, or integrated as part of the processor 220. The system 200 copies data from the memory 230 and/or the storage device 260 to the cache for quick access by the processor 220. In this way, the cache 222 provides a performance boost that avoids processor 220 delays while waiting for data. These and other modules can be configured to control the processor 220 to perform various actions.

Other system memory 230 may be available for use as well. The memory 230 can include multiple different types of memory with different performance characteristics. It can be appreciated that the disclosure may operate on a computing device 200 with more than one processor 220 or on a group or cluster of computing devices networked together to provide greater processing capability. The processor 220 can include any general purpose processor and a hardware module or software module, such as module 1 262, module 2 264, and module 3 266 stored in storage device 260, configured to control the processor 220.

The present disclosure also contemplates processor 220 being implemented as a special-purpose processor where software instructions are incorporated into the actual processor design. Further, the processor 220 can be a completely self-contained computing system, containing multiple cores or processors, a bus, memory controller, cache, etc. Additionally, processor 220 can be a multi-core processor, including symmetric or asymmetric multi-core processor designs.

The system bus 210 may be any of several types of bus structures including a memory bus or memory controller, a peripheral bus, and a local bus using any of a variety of bus architectures. A basic input/output (BIOS) stored in ROM 240 or the like, can provide the basic routine that helps to transfer information between elements within the computing device 200, such as during start-up. The computing device 200 further includes storage devices 260 such as a hard disk drive, a magnetic disk drive, an optical disk drive, tape drive or the like. The storage device 260 can include software modules 262, 264, 266 for controlling the processor 220. Other hardware or software modules are contemplated. The storage device 260 is connected to the system bus 210 by a drive interface. The drives and the associated computer readable storage media provide nonvolatile storage of computer readable instructions, data structures, program modules and other data for the computing device 200. In one aspect, a hardware module that performs a particular function includes the software component stored in a computer-readable medium in connection with the necessary hardware components, such as the processor 220, bus 210, display 270, and so forth, to carry out the function. The basic components are known to those of skill in the art and appropriate variations are contemplated depending on the type of device, such as whether the device 200 is a small, handheld computing device, a desktop computer, or a computer server.

Although the exemplary embodiment described herein employs the hard disk 260, it should be appreciated by those skilled in the art that other types of computer readable media which can store data that are accessible by a computer, such as magnetic cassettes, flash memory cards, digital versatile disks, cartridges, random access memories (RAM) 250, read only memory (ROM) 240, a cable or wireless signal containing a bit stream and the like, may also be used in the exemplary operating environment. Computer-readable storage media expressly exclude non-tangible media for carrying energy, carrier signals, electromagnetic waves, and signals per se.

To enable user interaction with the computing device 200, an input device 290 represents any number of input mechanisms, such as a microphone for speech, a touch-sensitive screen for gesture or graphical input, keyboard, mouse, motion input, speech and so forth. An output device 270 can also be one or more of a number of output mechanisms known to those of skill in the art. In some instances, multimodal systems enable a user to provide multiple types of input to communicate with the computing device 200. The communications interface 280 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 220. The functions these blocks represent may be provided through the use of either shared or dedicated hardware, including, but not limited to, hardware capable of executing software and hardware, such as a processor 220, that is purpose-built to operate as an equivalent to software executing on a general purpose processor. For example the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 240 for storing software performing the operations discussed below, and random access memory (RAM) 250 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 200 shown in FIG. 2 can practice all or part of the recited methods, can be a part of the recited systems, and/or can operate according to instructions in the recited non-transitory computer-readable storage media. Such logical operations can be implemented as modules configured to control the processor 220 to perform particular functions according to the programming of the module. For example, FIG. 2 illustrates three modules Mod1 262, Mod2 264 and Mod3 266, which are modules configured to control the processor 220. These modules may be stored on the storage device 260 and loaded into RAM 250 or memory 230 at runtime or may be stored as would be known in the art in other computer-readable memory locations.

Figure 3:
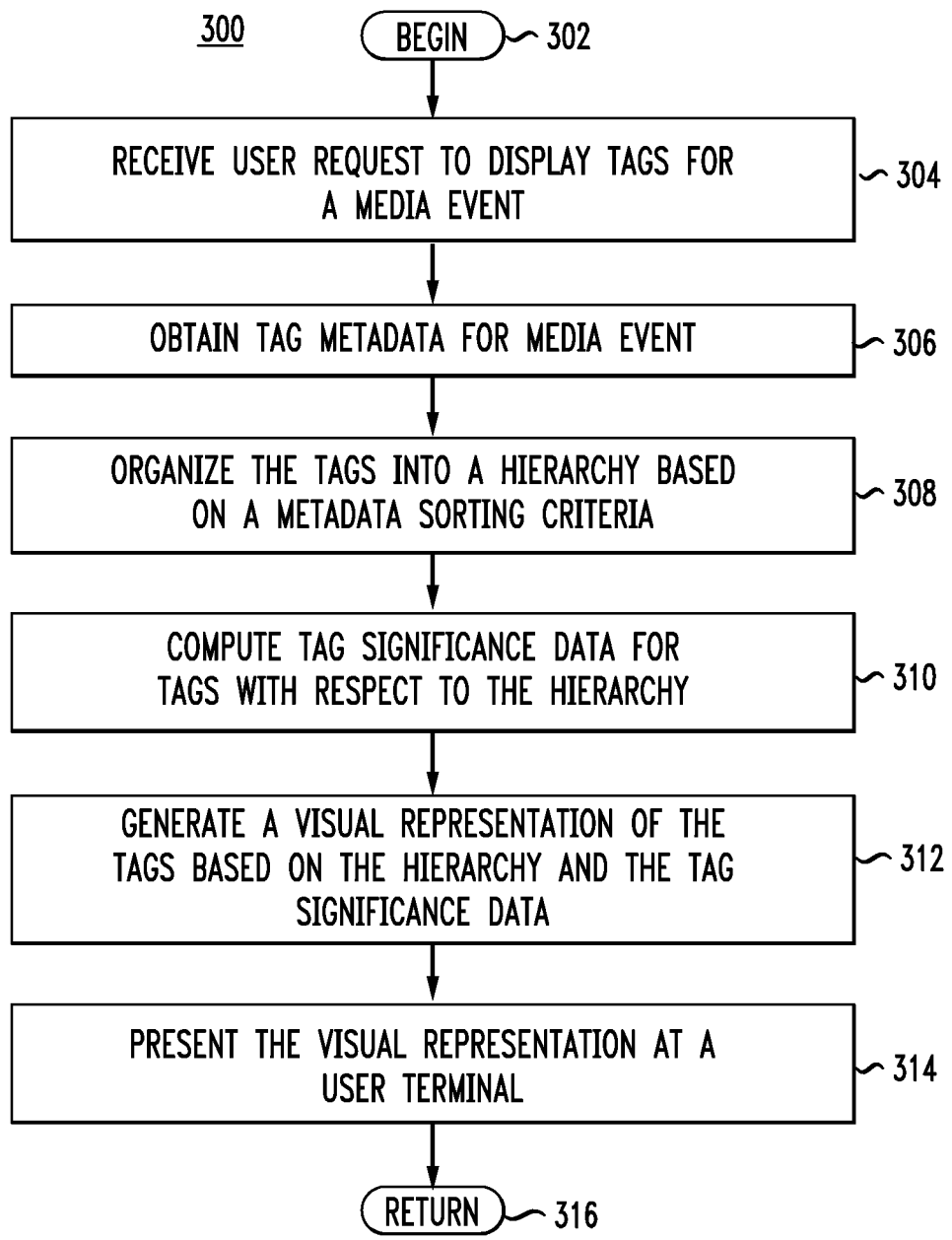
FIG. 3 is a flowchart of steps in an exemplary method for visualization of tag metadata for a media event.

Having disclosed some basic system components, the disclosure now turns to the exemplary method embodiment shown in FIG. 3. For the sake of clarity, the method is discussed in terms of an exemplary system such as is shown in FIGS. 1 and 2 configured to practice the method.

FIG. 3 is a flowchart of steps in an exemplary method 300 for visualization of tag metadata for a media event. The method 300 begins at step 302 and continues on to step 304. At step 304, a user request to view tags associated with at least one media event is received. For example, the archival retrieval module 178 of archival server 128 can receive a request from one of communication devices 120, 148, and 150 to display tags associated with a selected media event or group thereof.

The request at step 304 can specify a media event of interest. The request can also specify some metadata selection or sorting criteria. In particular, metadata selection/sorting criteria can specify metadata of interest to the requesting user or a user ranked listing of metadata of interest. Additionally, the present disclosure contemplates that such a request can also include selection criteria for limiting the number of tags presented to the user. That is, the request can specify presenting only specific types of tags or tags associated with particular metadata values. The present disclosure also contemplates that the metadata selection criteria can be generated automatically in response to selection of a tag in an existing hierarchical representation of tags. That is, in response to selection of a tag, the tag can define a top level of a representation and selection criteria for the existing representation is automatically reordered based on the selection.

Although the request at step 304 is described as specifying the metadata sort criteria and/or tag selection criteria, the present disclosure is not limited in this regard. Rather, the present disclosure also contemplates that in some circumstances the metadata sort criteria and/or tag selection criteria may be pre-defined.

In the present disclosure, tags can be associated with metadata that specifies various types of information for the tags. For example, the metadata can include a type of the tags (i.e., descriptive, identifying, links, etc.), date/time of tagging, a position of the tag with respect the media event, a length of time associated with the tag, media event information, media event segment information, speaker information, tagger information, group information, and topic information, to name a few. The tags can also specify audio and/or visual information. For example, the tags can specify sounds, graphics, images, or other non-textual data. However, the present disclosure also contemplates that other types of metadata can be provided for the tags.

Once the system receives the tag request at step 304, tag metadata responsive to the request is received or obtained at step 306. That is, the tag metadata associated with the tags for a media event (or portions thereof) specified in the request is retrieved or obtained. For example, the archival retrieval module 178, responsive to a request from communication devices 120, 148, or 150, can be configured to retrieve data from one or more of databases 130-140 to obtain tag data, such as the metadata stored in metadata database 136.

Figure 4:
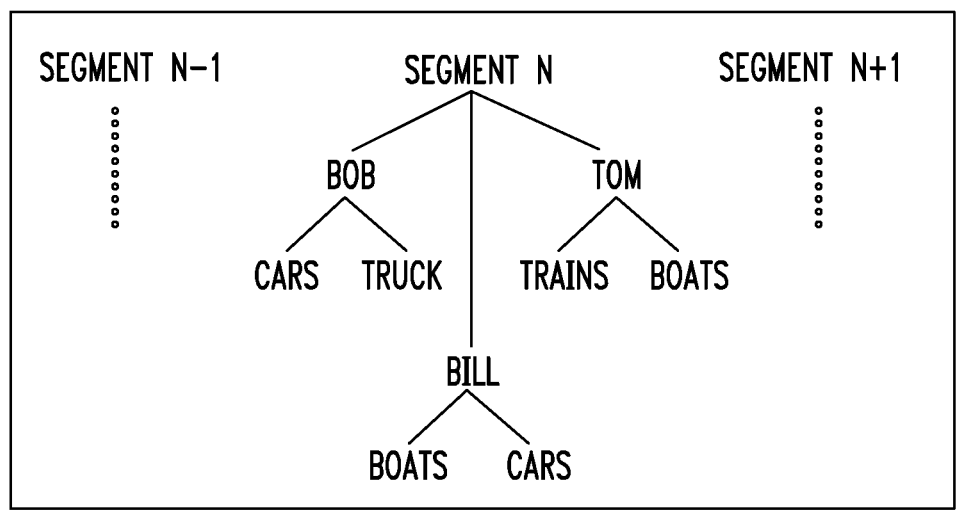
FIG. 4 depicts an exemplary treemap representation of tags for a media event according to metadata sort criteria.

After the tag metadata is obtained at step 306, the system can organize or assemble the tags into a hierarchy of tags at step 308. In particular, the system can organize tags based on the metadata sorting criteria (specified at step 306 or generated a priori) to show their hierarchical relationships with respect to the metadata. FIG. 4 illustrates this concept.

FIG. 4 depicts an exemplary treemap representation 400 of tags for a media event according to metadata sort criteria. For ease of illustration and explanation, the set of tags are selected to indicate segments of a media event, speakers participating in the media event, and topics discussed during the media event. Specifically, tags "SEGMENT N−1", "SEGMENT N", "SEGMENT N+1", "BOB", "BILL", "TOM", "CARS", "TRUCKS", "TRAINS", and "BOATS" are shown in FIG. 4. In a conventional tag cloud, these tags would be displayed as a single cloud, where the indicia for the tags would be adjusted based on a frequency of tagging or some other measurement of the relative significance of the tags in the media event.

However, at step 308, the metadata sorting criteria is used to organize the display of these tags. In particular, a hierarchy of tags is generated based on the metadata sorting criteria. For example, if the metadata sorting criteria specifies that the tags should be ordered according to segments, speakers associated with segments, and topic discussed by speakers during each segment, the treemap representation 400 shown in FIG. 4 is generated.

As shown in FIG. 4, the segment tags of the media event ( . . . , "SEGMENT N−1", "SEGMENT N", "SEGMENT N+1", . . . ) are used to define the topmost nodes of the treemap. Thereafter, the child nodes for these topmost nodes are selected to be defined by the speaker tags. For example, the speaker tags may be associated with metadata identifying a segment of the media event in which the speakers identified by the speaker tags spoke. In the case of FIG. 4, where tags "BOB", "BILL", and "TOM" identify speakers Bob, Bill, and Tom during the media event and the associated metadata indicates that these identified speakers spoke during the segment identified by tag "SEGMENT N", the treemap is configured to define tags "BOB", "BILL", and "TOM" as child nodes of the node defined by "SEGMENT N". Thus, these speaker tags form sibling tags in the hierarchy. That is, tags associated with a same tag in a next higher level in the hierarchy. Similarly, child nodes for other nodes defined by other segment tags can be similarly selected. Thereafter, for each of the nodes associated with a speaker in a segment of the media event, the topic tags associated with the speaker can be used to form the next level of nodes in the treemap representation 400. For example, the topic tags can have metadata identifying a speaker and a segment of the media event during which the topic identified by the topic tag was discussed. In the case of FIG. 4, tags "CARS" and "TRUCKS" have metadata identifying speaker Bob and segment N. Accordingly, for the node defined by tag "BOB" that is a child node of the node defined by tag "SEGMENT N", child nodes are defined using the tags "CARS" and "TRUCKS". Similarly, the tags "TRAINS" and "BOATS" can be used to define child nodes for the node defined by tag "TOM" and the tags "BOATS" and "CARS" can be used to define child nodes for the node defined by tag "BILL", as shown in FIG. 4.

It is worth noting that the present disclosure contemplates that a same tag can be included in several locations in the hierarchy. In contrast, a conventional tag cloud typically includes each tag only once. Accordingly, the present disclosure provides a significant benefit over conventional tag clouds, as the hierarchy can be used to identify tags associated with different aspects or portions of the media event.

Referring back to FIG. 3, once the tags are organized into a hierarchy at step 308, the tag significance data can be computed at step 310, with respect to the hierarchy. That is, for each group of sibling tags in the hierarchy (i.e., tags defining child nodes associated with a same parent node), data is computed for each tag that represents the degree of importance or significance of the tag as compared to its sibling tags. Tag significance data can include, for example, a frequency of use of the tags, a ranking of the tags, a duration of the media segment associated with the tag, or a similarity/difference measure of the tags, to name a few. However, the present disclosure contemplates that other types of tag significance data can also be computed. In the present disclosure, data from databases 130-140 can be used to generate the tag significance data. For example, in the case of tag significance data representing frequency of use, the number of occurrences of the tags, separately or in conjunction with other metadata, can be used to generate frequency of use data.

After the tag significance data is computed at step 310, a visual representation of the tags can be generated at step 312 and the visual representation can be presented at a requesting user terminal at step 314. Method 300 can then resume previous processing at step 316, including repeating method 300.

In the present disclosure, the visual representation generated and presented at steps 312 and 314 is configured to visually depict the hierarchy of the tags obtained at step 308. Further, the indicia for each of the tags can be configured to visually depict the relative significance of the tags obtained at step 310. This is also illustrated with respect to FIG. 4. That is, the visual representation of the tags can be configured to include a treemap representation, as shown in FIG. 4. However, as further shown in FIG. 4, the indicia for each of the tags can be adjusted to indicate the relative significance of the tags.

For ease of illustration, the indicia in FIG. 4 are selected to be the tags themselves (i.e., the tag). Further, the tags are configured in representation 400 to vary in font or lettering size according to frequency of use of the tags. That is, tags with letters having larger font sizes indicate a higher frequency of use of these tags. Similarly, tags with letters having smaller font sizes indicate a lower frequency of use of these tags. Accordingly, providing the tag "BOB" with a larger font size than tags "TOM" or "BILL" indicates a greater frequency of tagging using the tag "BOB" during segment N of the media event as compared to the tags "TOM" or "BILL". Similarly, since the tag "CARS" associated with tag "BOB" has a larger font size than tag "TRUCKS" associated with tag "BOB", this would indicate a greater frequency of tagging using the tag "CARS" than the tag "TRUCKS" during a presentation by speaker Bob during segment N of the media event. Similarly, other tags in the hierarchy can be sized in a similar fashion.

As a result, when a user is presented with the representation in FIG. 4 and it is understood by the user that the font size is indicative of the relative significance, the user can immediately comprehend the relative significance of each of the tags based on the difference in the letter sizes of the tags. Further, because of the hierarchical arrangement of the tags, the user can also immediately comprehend the relationships between the segments, speakers and topics based on the spatial arrangement of the tags in the treemap representation 400.

Although the example in FIG. 4 illustrates utilizing letters and font size to display the tags and their relative significance, respectively, the present disclosure also contemplates visually displaying a relative significance of the tags in other ways. That is, the tags in the representation need not be alphanumeric symbols. Further, a size, a shape, a color, or a style of the indicia for the tags, or any combinations thereof, can be adjusted to indicate a difference in tag significance.

Further, the present disclosure is not limited to representing the hierarchy and relative significance of the tags using a treemap representation. Rather other methods can be used as well. Two exemplary methods are illustrated in FIGS. 5 and 6.

Figure 5:
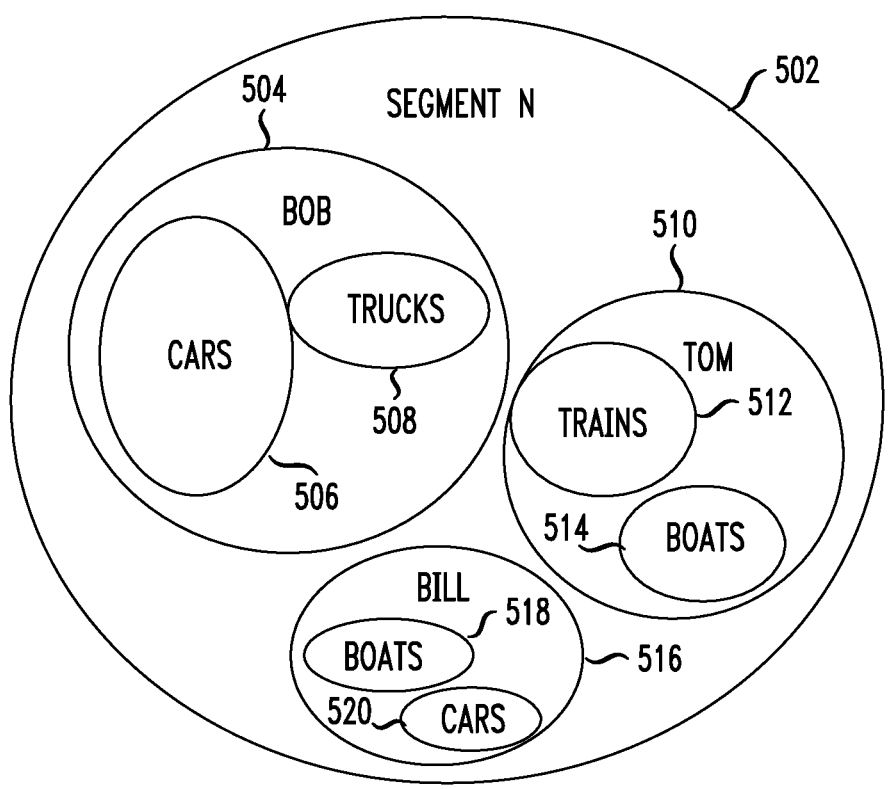
FIG. 5 depicts an exemplary set diagram representation of tags for a media event according to metadata sort criteria.
Figure 6:
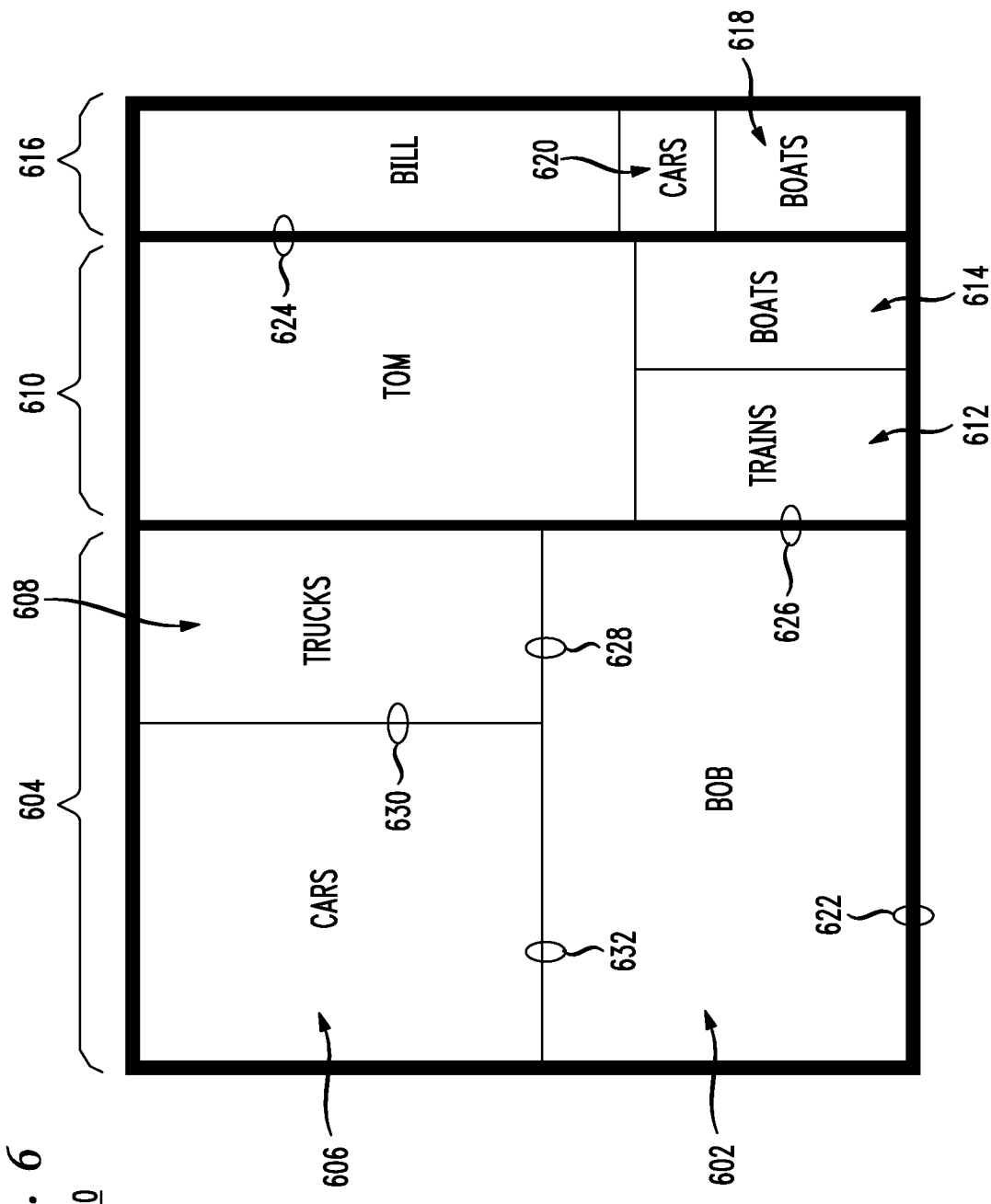
FIG. 6 depicts an exemplary facet or nested shape representation of tags for a media event according to metadata sort criteria.

FIG. 5 depicts an exemplary set diagram representation 500 of tags for a media event according to metadata sort criteria. That is, rather than representing the tags using a series of parent nodes and child nodes, the hierarchy in FIG. 4 can be represented as a series of sets and subsets, labeled for identification, as shown in FIG. 5. That is, child nodes are represented as subsets of parent nodes. For example, tag "SEGMENT N" is represented by the set 502. Tag "BOB" is represented by subset 504 within set 502. Tags "CARS" and "TRUCKS" associated with tag "BOB" are then represented by subsets 506 and 508, respectively, within subset 504. Similarly, subsets 510, 512, and 514 are provided for related tags "TOM", "TRAINS", and "BOATS" and subsets 516, 518, and 520 are provided for related tags "BILL", "BOATS", and "CARS". Accordingly, the set/subset notation allows the user to immediately comprehend the child-parent relationships between the various tags in the hierarchy.

Additionally, the sizes of the subsets in representation 500 are adjusted to convey the relative significance of the TAGS. That is, larger areas indicate a higher frequency of use and smaller areas indicate a lower frequency of use. Accordingly, the larger area of subset 504 associated with the tag "BOB", as compared to the areas of subsets 510 and 516 for the tags "TOM" or "BILL", respectively, indicates a greater frequency of tagging using the tag "BOB" during segment N of the media event as compared to the tags "TOM" or "BILL". Similarly, since the subset 506 associated with the tag "CARS" has a larger area than the area of the subset 508 associated with the tag "TRUCK", this would indicate a greater frequency of tagging using the tag "CARS" than the tag "TRUCKS" during a presentation by speaker Bob during segment N of the media event. Similarly, other subset in such representations can be sized in a similar fashion to represent the difference in relative significance between the tags.

As a result, when a user is presented with representation 500, as shown in FIG. 5, and it is understood by the user that the areas of the sets and subsets are indicative of the relative significance of the associated tags, the user can easily and quickly comprehend the relative significance of each of the tags based on the differences in these areas. Further, because of the set/subset arrangement, the user can also immediately comprehend the parent-child relationships between the segments, speakers and topics based on the spatial arrangement.

FIG. 6 depicts an exemplary facet or nested shape representation 600 of tags for a media event according to metadata sort criteria. That is, rather than representing the tags using the set/subset representation, as in FIG. 5, the hierarchy in FIG. 4 can be represented as a series of labeled facets (i.e., nested shapes), as shown in FIG. 6. As used herein with respect to shapes, the term "nested" or "nesting" refers to a defining first shape areas within a second shape area, where the first shape areas are strictly smaller than the second shape area, where each of the first shape areas shares at least one boundary with at least one of the second shape area or one other of the first shapes areas, and where the first shape areas are non-overlapping.

For example, tag "SEGMENT N" is represented by the shape area 602. Tag "BOB" is represented by shape area 604 within shape area 602, where a portion of the boundary of shape area 604 is defined by the boundary of shape area 602. Specifically, three sides of the rectangle defining shape area 604 are along three sides of the rectangle defining shape area 602. Tags "CARS" and "TRUCKS" associated with tag "BOB" are similarly represented by shape areas 606 and 608, respectively, within shape area 604. As shown in FIG. 6, a portion of the boundaries of these shape areas are defined by the boundaries of shape area 604 (and thus shape area 602). Similarly shape areas 610, 612, and 614 are provided for related tags "TOM", "TRAINS", and "BOATS" and shape areas 616, 618, and 620 are provided for related tags "BILL", "BOATS", and "CARS". In this regard, the facet diagram representation is similar to the set/subset representation.

However, a representation based solely on nested shaped areas can be difficult to comprehend, as it can be difficult to determine the child-parent relationship between the shape areas. Accordingly, the present disclosure contemplates providing additional indicia to facilitate comprehension of the child-parent relationships. In particular, the present disclosure provides for configuring the boundaries of the shape areas to vary in other to indicate the child-parent relationships. For example, as shown in FIG. 6, the child tags are associated with a boundary line thickness that is smaller than that of a corresponding parent. Thus, the boundary line for shape area 602 is significantly thicker than that of shape areas 604, 610, and 616, as evidenced by the difference in thickness between boundary line 622 and boundary lines 624 and 626. Similarly, the boundary lines for shape area 604 are significantly thicker for that that of shape areas 606 and 608, as evidenced by the difference in thickness between boundary lines 622 and 626 and boundary lines 628, 630, and 632. Further, shape areas for sibling tags can be configured to have a same boundary line thickness, as evidenced by the similar thickness of boundary lines 628, 630, and 632. Similarly, boundary lines for other shape areas can be similarly configured. As a result, when the user is presented with the representation in FIG. 6, the user can discern the child-parent relationship and thus comprehend the hierarchy of the tags.

Although the example above is described with respect to the thickness of boundary lines, the present disclosure is not limited to this configuration. Rather, the present disclosure contemplates that different types of boundary lines can be provided by adjusting a thickness or a style of the boundary line. For example, a boundary line can be dashed, dotted, dash-dotted, or multi-lined, to name a few. Additionally, a boundary line can have a non-linear pattern, such as a sawtooth, triangular, rectangular, or sinusoid pattern, to name a few. Similarly, the system can visually depict related groups of shape areas with similar colors to indicate their relationships to each other.

Further, to convey the relative significance of the tags, the total area of each shape area can be selected according their relative significance. For example, a larger shape area can be used to indicate a higher frequency of use and a smaller shape area can be used to indicate a lower frequency of use. Accordingly, the larger shape area 604 associated with the tag "BOB", as compared to the smaller shape areas 610 and 616 for the tags "TOM" or "BILL", respectively, indicates a greater frequency of tagging using the tag "BOB" during segment N of the media event as compared to tagging of the tags "TOM" or "BILL". Similarly, since the shape area 606 associated with the tag "CARS" has a larger area than the shape area 608 associated with the tag "TRUCKS", this would indicate a greater frequency of tagging using the tag "CARS" than the tag "TRUCKS" during a presentation by speaker Bob during segment N of the media event. Similarly, other shape areas can be sized in a similar fashion to represent the difference in relative significance between the tags.

As a result, when a user is presented with the representation in FIG. 6 and it is understood by the user that the size of the shape area are indicative of the relative significance of the associated tags, the user can immediately comprehend the relative significance of each of the tags based on the differences in the shape areas. Further, if it is understood by the user that the thickness of the boundary lines for the shape area are indicative of the child-parent relationships of the tags, the user can immediately comprehend the hierarchy of the tags, and thus comprehend the relationships between the segments, speakers and topics based on the spatial arrangement.

In FIGS. 5 and 6, circular and rectangular shapes are used to represent tags. However, the present disclosure contemplates that any other types of shapes can be used in these representations. Further, the present disclosure also contemplates that the labels can also be used to convey relative significance information to a user. For example, in one configuration, the font or lettering size can be proportional to a corresponding shape area size, thus further enhancing the user's ability to comprehend the relative significance of the different tags. In another configuration, this font or lettering size can also be used to convey different information than that conveyed by the areal differences in shape areas or set/subsets. For example, the system can indicate tagging frequency by shape area, and indicate whether such tagging was primarily positive or negative by font size. That is, a small font size can indicate a negative user response and a large font size can indicate a positive user response. However, the present disclosure is not limited to changes in label size. Rather, the present disclosure contemplates using one or more different types of changes, including changes in label type, size, shape, color, boundary type, position, and style, to name a few.

In any of the treemaps and other visualizations disclosed herein, the system can also output various dimensions or characteristics. Further, the treemaps can be displayed in various types of media, such as video, audio, text-based graphics, and so forth. The system can generate a static snapshot treemap view, or can generate a live visualization of an event as the event is taking place. In this variation, the base dimension can be time. A live visualization can grow over time, and the individual cells (such as topics) can grow as well. The cells can represent other types of metadata, such as speaker turns. One cell can represent a single piece of metadata or information or one cell can represent multiple pieces of information.

In one simple application, the system provides a simple speaker visualization tool for a conference call that does not require "tagging" infrastructure. The system can still operate in this scenario, but operate on a stream of speaker events instead of or in conjunction with tags from users.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. A computer-readable storage medium or device expressly excludes transitory signals per se and transitory mediums such as carrier waves, wires, cables, fiber optics, infrared media, and the like. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, by a processor via a communication interface, a tag request;
   obtaining, from the tag request, tag metadata for a plurality of tags generated during a live media event, the plurality of tags being associated with the live media event and wherein the tag metadata is responsive to the tag request;
   organizing, by the processor, the plurality of tags into a hierarchy of tags based on a sorting criteria of the tag metadata, the hierarchy of tags comprising a first level of tags, a second level of tags below the first level of tags, and a third level of tags below the second level of tags, wherein the first level of tags represents temporal segments of the live media event, wherein the second level of tags represents speakers associated with the live media event, wherein the third level of tags represents discussion topics associated with the live media event, and wherein at least one tag occurs in two or more locations in the hierarchy of tags;
   computing, by the processor, tag significance data for the hierarchy of tags based, at least in part, on the tag metadata and wherein the tag significance data for a tag comprises at least one of a frequency of use of the tag, a duration of a media segment associated with the tag, and a similarity measure of the tag; and
   generating, by the processor, a visual representation, for presentation by a user terminal coupled to the processor, of the hierarchy of tags, wherein a plurality of indicia for the hierarchy of tags are spatially arranged to form one of a treemap and a set diagram of the plurality of indicia, wherein sibling tags of the hierarchy of tags are represented by sibling nodes in the one of the treemap and set diagram and to visually depict a relative significance of each tag of the plurality of tags based on the tag significance data; and
   wherein a first characteristic of indicia for sibling tag subsets in the hierarchy of tags is different from a second characteristic of indicia for a corresponding parent subset.

2. The method of claim 1, wherein generating the visual representation further comprises depicting the relative significance of each tag of the plurality of tags by adjusting one of a size, a shape, a style, or a color of each of the plurality of indicia.

3. The method of claim 1, wherein a group of sibling subsets in the set diagram is further spatially arranged to form a facet diagram.

4. The method of claim 1, wherein one of the first characteristic or the second characteristic comprises a boundary line.

5. A system comprising:
   a processor of a computing device and the processor being coupled to other components of the computing device and wherein the computing device comprises a communication interface; and
   a non-transitory computer-readable storage medium storing instructions which, when executed by the processor, cause the processor to perform operations comprising:
   receiving, by a processor via a communication interface, a tag request;
   obtaining, from the tag request, tag metadata for a plurality of tags generated during a live media event, the plurality of tags being associated with the live media event and wherein the tag metadata is responsive to the tag request;
   organizing the plurality of tags into a hierarchy of tags based on a sorting criteria of the tag metadata, the hierarchy of tags comprising a first level of tags, a second level of tags below the first level of tags, and a third level of tags below the second level of tags, wherein the first level of tags represents temporal segments of the live media event, wherein the second level of tags represents speakers associated with the live media event, wherein the third level of tags represents discussion topics associated with the live media event, and wherein at least one tag occurs in two or more locations in the hierarchy of tags;
   computing tag significance data for the hierarchy of tags based, at least in part, on the tag metadata and wherein the tag significance data for a tag comprises at least one of a frequency of use of the tag, a duration of a media segment associated with the tag, and a similarity measure of the tag; and
   generating, for presentation by a user terminal coupled to the processor, a visual representation of the hierarchy of tags, wherein a plurality of indicia for the hierarchy of tags are spatially arranged to visually depict a relative significance of each tag of the plurality of tags based on the tag significance data.

6. The system of claim 5, wherein the instructions to cause the processor to perform generating the visual representation further comprises instructions to cause the processor to perform depicting the relative significance of each tag of the plurality of tags by adjusting one of a size, a shape, a style, or a color of each of the plurality of indicia.

7. The system of claim 5, wherein the instructions further comprise instructions to cause the processor to perform spatially arranging the plurality of indicia to form a treemap of the plurality of indicia, wherein sibling tags of the hierarchy of tags are represented by sibling nodes in the treemap.

8. The system of claim 5, wherein the instructions further comprise instructions to cause the processor to perform spatially arranging the plurality of indicia to form a set diagram of the plurality of indicia, wherein each group of sibling tags in the hierarchy of tags defines a group of sibling subsets for the set diagram.

9. The system of claim 8, wherein the group of sibling subsets in the set diagram is further spatially arranged to form a nested facet diagram.

10. The system of claim 8, wherein a first characteristic of indicia for the group of sibling subsets is different from a second characteristic of indicia for a corresponding parent subset.

11. The system of claim 8, wherein one of the first or second characteristic comprises a set outline.

12. A non-transitory computer-readable storage device storing instructions which, when executed by a processor, the processor comprising a portion of a computing device and coupled with components of the computing device, cause the processor to perform operations comprising:
receiving, by the processor via a communication interface, a tag request;
receiving, from the tag request, tag metadata for a plurality of tags generated during a live media event, the plurality of tags being associated with the live media event and wherein the tag metadata is responsive to the tag request;
organizing the plurality of tags into a hierarchy of tags based on a sorting criteria of the tag metadata, the hierarchy of tags comprising a first level of tags and a second level of tags, the second level of tags being below the first level of tags, and a third level of tags below the second level of tags, wherein the first level of tags represents temporal segments of the live media event, wherein the second level of tags represents speakers associated with the live media event, wherein the third level of tags represents discussion topics associated with the live media event, and wherein at least one tag occurs in two or more locations in the hierarchy of tags;
computing tag significance data for the hierarchy of tags based, at least in part, on the tag metadata and wherein the tag significance data for a tag comprises at least one of a frequency of use of the tag, a duration of a media segment associated with the tag, and a similarity measure of the tag; and
generating a visual representation, for presentation by a user terminal coupled to the processor, of the hierarchy of tags, wherein a plurality of indicia for the hierarchy of tags are spatially arranged to visually depict a relative significance of each tag of the plurality of tags based on the tag significance data.

13. The non-transitory computer-readable storage device of claim 12, storing additional instructions which, when executed by the processor, cause the processor to perform further operations comprising depicting the relative significance of each tag of the plurality of tags by adjusting one of a size, a shape, a style, or a color of each of the plurality of indicia.

14. The non-transitory computer-readable storage device of claim 12, storing additional instructions which, when executed by the processor, cause the processor to perform further operations comprising spatially arranging the plurality of indicia to form a treemap of the plurality of indicia, wherein sibling tags of the hierarchy tags are represented by sibling nodes in the treemap.

15. The non-transitory computer-readable storage device of claim 12, storing additional instructions which, when executed by the processor, cause the processor to perform further operations comprising spatially arranging the plurality of indicia to form a set diagram of the plurality of indicia, wherein each group of sibling tags in the hierarchy of tags defines a group of sibling subsets for the set diagram.

16. The method of claim 1, wherein that tag significance for the tag comprises the frequency of use of the tag, the duration of the media segment associated with the tag, and the similarity measure of the tag.

17. The non-transitory computer-readable storage device of claim 15, storing additional instructions which, when executed by the processor, cause the processor to perform further operations comprising specifying a first boundary line for subsets of sibling tags in the hierarchy of tags that is different from a second boundary line for a parent subset of the sibling subsets.

* * * * *